(12) United States Patent
Spears et al.

(10) Patent No.: US 7,118,414 B2
(45) Date of Patent: Oct. 10, 2006

(54) COMPUTER INPUT/OUTPUT CONNECTOR ASSEMBLY

(75) Inventors: Louis E. Spears, Rancho Cucamonga, CA (US); Robert G. Thunell, Alta Loma, CA (US)

(73) Assignee: Northstar Systems, Inc., Rancho Cucamonga, CA (US)

(*) Notice: Subject to any disclaimer, the term of this patent is extended or adjusted under 35 U.S.C. 154(b) by 0 days.

(21) Appl. No.: 10/764,210

(22) Filed: Jan. 22, 2004

(65) Prior Publication Data

US 2005/0164548 A1 Jul. 28, 2005

(51) Int. Cl.
*H01R 13/66* (2006.01)
(52) U.S. Cl. .................. 439/540.1; 439/607
(58) Field of Classification Search .......... 439/92, 439/95, 607, 701, 540.1
See application file for complete search history.

(56) References Cited

U.S. PATENT DOCUMENTS

| | | | | |
|---|---|---|---|---|
| 3,376,543 A | * | 4/1968 | Hammell | 439/540.1 |
| 3,389,369 A | * | 6/1968 | Curtis | 439/540.1 |
| 3,711,817 A | * | 1/1973 | Carter et al. | 439/272 |
| 5,129,842 A | * | 7/1992 | Morgan et al. | 439/532 |
| 5,366,388 A | * | 11/1994 | Freeman et al. | 439/540.1 |
| 6,375,495 B1 | * | 4/2002 | Szeto | 439/540.1 |
| 6,846,200 B1 | * | 1/2005 | Hsu | 439/540.1 |

* cited by examiner

*Primary Examiner*—Khiem Nguyen
(74) *Attorney, Agent, or Firm*—Townsend and Townsend and Crew; Guy W. Chambers

(57) ABSTRACT

A computer input/output connector assembly which uses connector port holders that can easily be snapped into a metal retaining bracket. In one preferred embodiment, the bracket of the present invention is mounted on the front of a personal computer tower. Connected to the bracket is a first connector port holder with two USB connector ports, a second connector port holder with an IEEE 1394 high speed communication port, a third connector port holder with three audio ports (e.g., audio in, audio out and microphone) and a fourth connector port holder with two video ports (e.g., RCA composite video and S-video). The connector port holder is preferably made of a durable, heat resistant plastic. This connector port holder includes movable cantilever strips with lock tabs which can firmly snap into holes in the bracket for mounting.

16 Claims, 4 Drawing Sheets

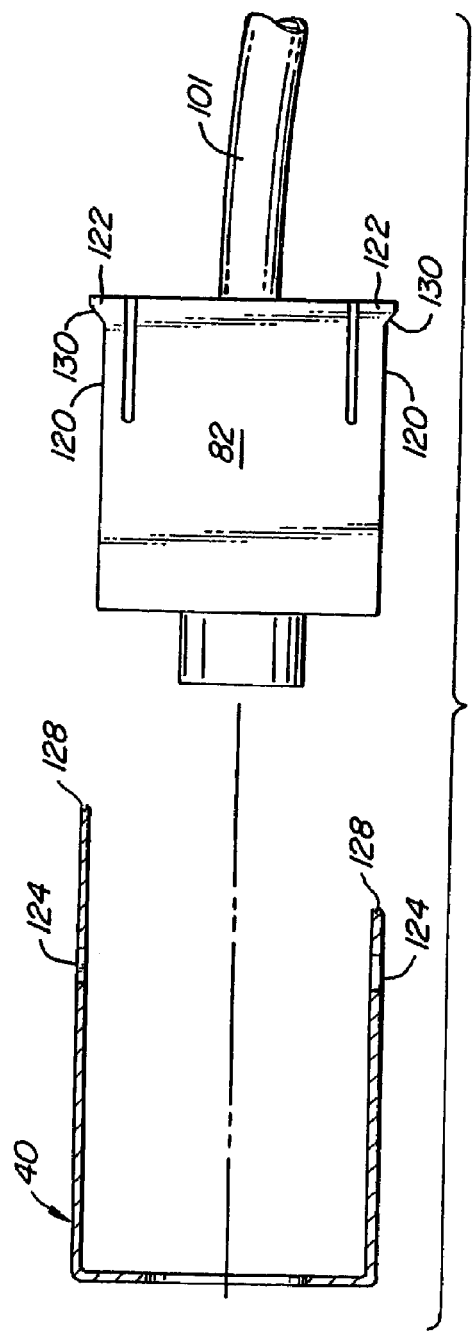
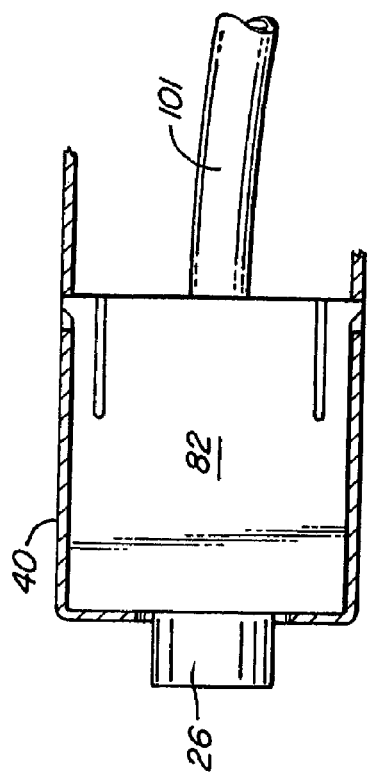
FIG. 4A
FIG. 4B

COMPUTER INPUT/OUTPUT CONNECTOR ASSEMBLY

TECHNICAL FIELD OF THE INVENTION

The present invention relates to an assembly for allowing input and/or output connections to be made to an electrical device, such as a personal computer. More particularly, a computer attachable bracket is provided which accepts snap-in connector port holders for allowing audio, visual, network, phone, modem and other input/output connections to be made to the computer.

BACKGROUND OF THE INVENTION

Computers have become an essential part of modern business. Through advances in chip design and manufacture, the cost of personal computers has dropped dramatically in recent years to the point where such personal computers are affordable by most consumers. As part of an effort to lower manufacturing costs, manufacturers have been looking for ways to more easily, reliably and flexibly assemble their computers.

While much attention has been paid to advances in chip design and manufacture, comparatively little effort has been put into optimizing the input and output connections to a personal computer. The input connections for a personal computer often involves input ports for a keyboard, mouse, joystick, microphone, video feed and, more recently, multi-use universal serial bus ("USB") connectors. The output connections for a personal computer often involve output ports for a printer, video monitor, modem and audio loudspeakers.

Thus far, a patch work of approaches has been used for installing input/output connector ports onto a computer. Historically, connector ports have been located at the rear of the computer housing where they are difficult for the user to access. In the case of audio and visual connector ports, they have often been built as part an electrical circuitboard which must then be screwed onto the computer housing. Other connectors, such as USB and high speed communications connectors, have been wrapped in a plastic plug which again must be screwed onto the computer housing. All of this screwing of connector ports onto a computer housing is labor intensive and, therefore, expensive. Moreover, present techniques for installing connector ports onto a computer housing allow little flexibility to change the type of connector ports being used if the manufacturer wants to use the same connector assembly for both high end computers with many connector ports and low end computers with fewer connector ports.

What is needed is an improved computer input/output connector assembly design which allows connector ports to be easily connected to the computer housing and provides the flexibility to quickly change the type of connector ports being used with the computer housing.

BRIEF SUMMARY OF THE INVENTION

The present invention provides a computer input/output connector assembly which uses connector port holders that can easily be snapped into a metal retaining bracket. The connector assembly can then be easily attached onto the interior chassis of a computer housing. If desired, individual connector port holders can alternatively be snapped out of the bracket and replaced with other connector port holders.

In one preferred embodiment, the bracket of the present invention is mounted on the front of a personal computer tower. Connected to the bracket is a first connector port holder with two USB connector ports, a second connector port holder with an IEEE 1394 high speed communication port, a third connector port holder with three audio ports (e.g., audio in, audio out and microphone) and a fourth connector port holder with two video ports (e.g., RCA composite video and S-video). The connector port holder is preferably made of a durable plastic, such as acrylonitrile-butadiene-styrene ("ABS") plastic. This connector port holder includes movable cantilever strips with lock tabs which can firmly snap into holes in the bracket for mounting. A wire then extends from each connector port holder to a header which can be attached to an appropriate circuitboard. To properly ground the bracket, electromagnetic interface ("EMI") contact strips are preferably included in the bracket to provide electrical contact to a neighboring computer component. Also, small springs or tabs can be included to electrically ground each of the connector ports to the bracket.

BRIEF DESCRIPTION OF THE DRAWINGS

FIG. 4A shows a close up side view of a connector port holder before it is attached to the bracket.

FIG. 4B shows a close up side view of the connector port holder of FIG. 4A after it is attached to the bracket.

DETAILED DESCRIPTION OF THE INVENTION

Figure 1:
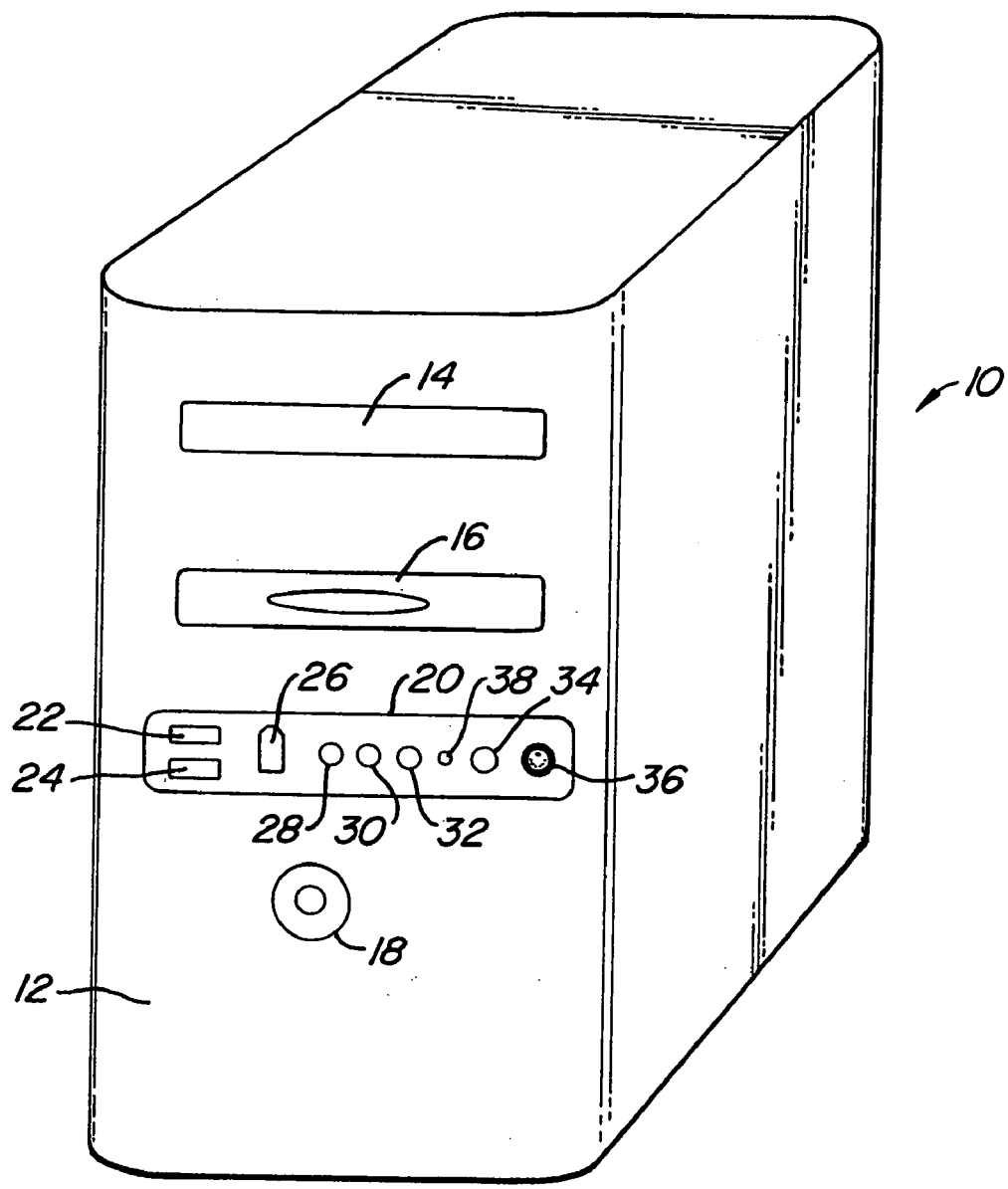
FIG. 1 shows a perspective view of a personal computer incorporating a preferred form of the computer input/output assembly of the present invention.

Referring now to FIG. 1, a tower 10 of a personal computer is shown. This computer tower 10 would typically house the circuitboards and chipsets which would perform most of the computer's operations. In many personal computers, this tower 10 would be connected to, among other things, a video monitor, keyboard, mouse and printer (not shown). On the front 12 of this personal computer tower 10 are numerous buttons and ports to allow the user to control operation of the personal computer. In the present embodiment, these buttons and ports, include a port for a CD/DVD drive 14, a port for a floppy disk drive 16, a power button 18 and an input/output connector assembly 20 of the present invention.

In the preferred embodiment, the input/output connector assembly 20 includes two USB connector ports 22, 24, an IEEE 1394 high speed communications port 26, a green audio out port 28, a red microphone port 30, a blue audio in port 32, a yellow RCA video connector port 34, an S-video connector port 36 and an empty port 38 which can accommodate an additional connector port. In an alternative embodiment for use with stereo loudspeakers, the empty port accommodates a right audio out connector port 38 which is adjacent to a left audio out connector port 32. In this alternative embodiment, connector port 28 is used as an audio in port.

Typically, the personal computer tower 10 would be constructed with an interior metal chassis (not shown) over which a plastic facade or bezel is placed for enhanced appearance. In this configuration, the CD/DVD drive 14, floppy disk drive 16 and input/output connector assembly 20 would all be firmly mounted onto the interior metal chassis. The plastic facade would then be connected to and overlaid over the outside of the interior metal chassis with openings left for the CD/DVD drive 14, floppy disk drive 16 and input/output connector assembly 20.

Figure 2:
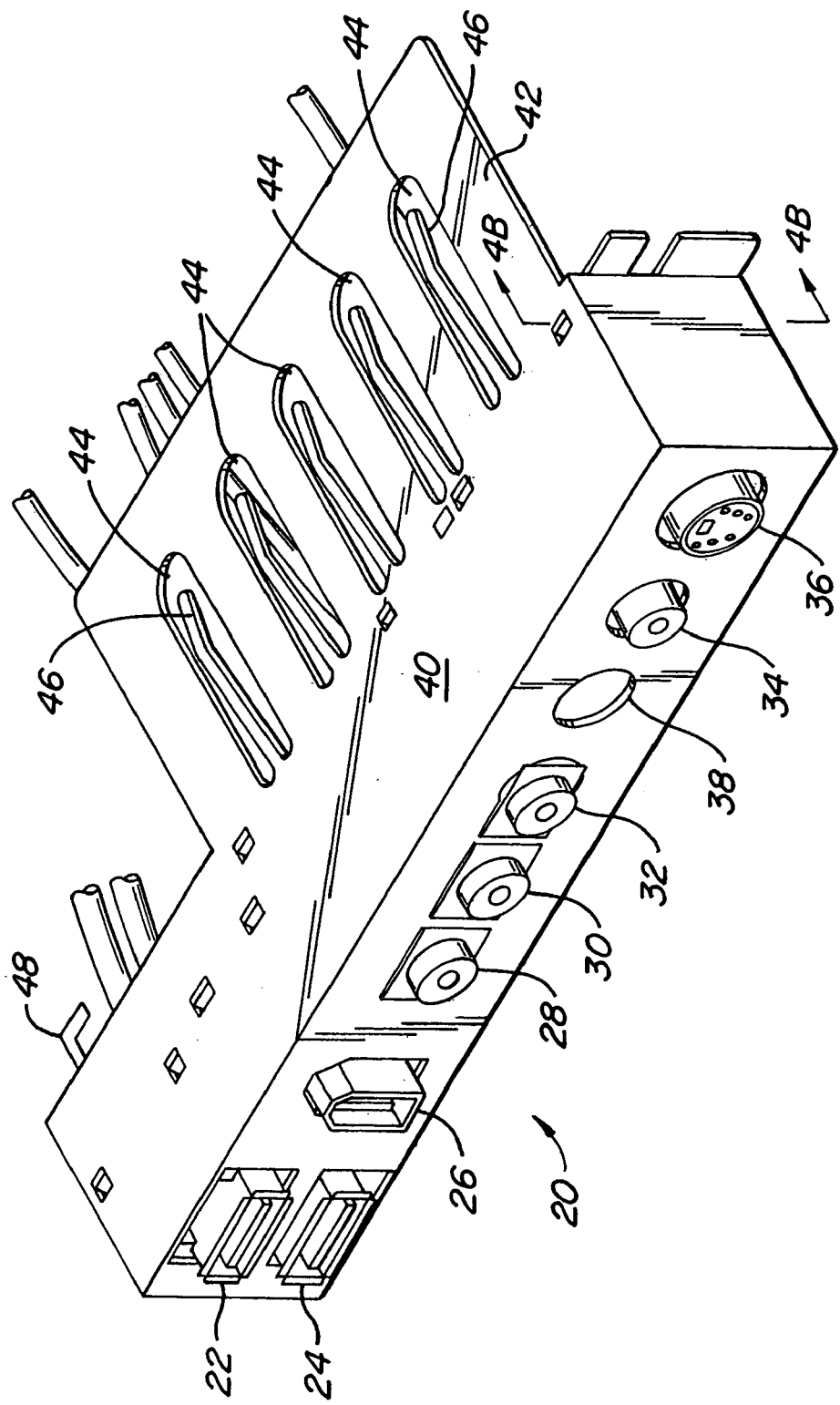
FIG. 2 shows a close up perspective view of a bracket of the present invention which incorporates numerous connector port holders.

Turning now to FIG. 2, a close up of a preferred embodiment of the input/output connector assembly 20 is shown. This input/output connector assembly 20 includes a bracket 40 into which the two USB connector ports 22, 24, IEEE 1394 high speed communications port 26, green audio out port 28, red microphone port 30, blue audio in port 32, yellow RCA video connector port 34 and S-video connector port 36 are inserted. The bracket 40 is preferably constructed of stamped sheet metal, such as steel, but may also be constructed of other durable, heat resistant materials, such as a hard plastic. A distal bracket plate 42 preferably extends rearwardly from the top of the bracket 40.

To provide better grounding and thereby prevent damage from electrical discharge, slots 44 are preferably stamped out of the distal bracket plate 42 while leaving electromagnetic interface ("EMI") contact strips 46 within the slots 44. These EMI contact strips 46 are then bent upward so that they will come into electrical contact with a peripheral computer component residing directly above input/output connector assembly 20, in this case the floppy disk drive 16 of FIG. 1. The bracket 40 also includes one or more hooks 48 to quickly attach the bracket 40 to the interior metal chassis. A screw hole (not shown) can also be formed onto the bracket to lock the bracket into the interior metal chassis after it has been hooked in place.

Figure 3:
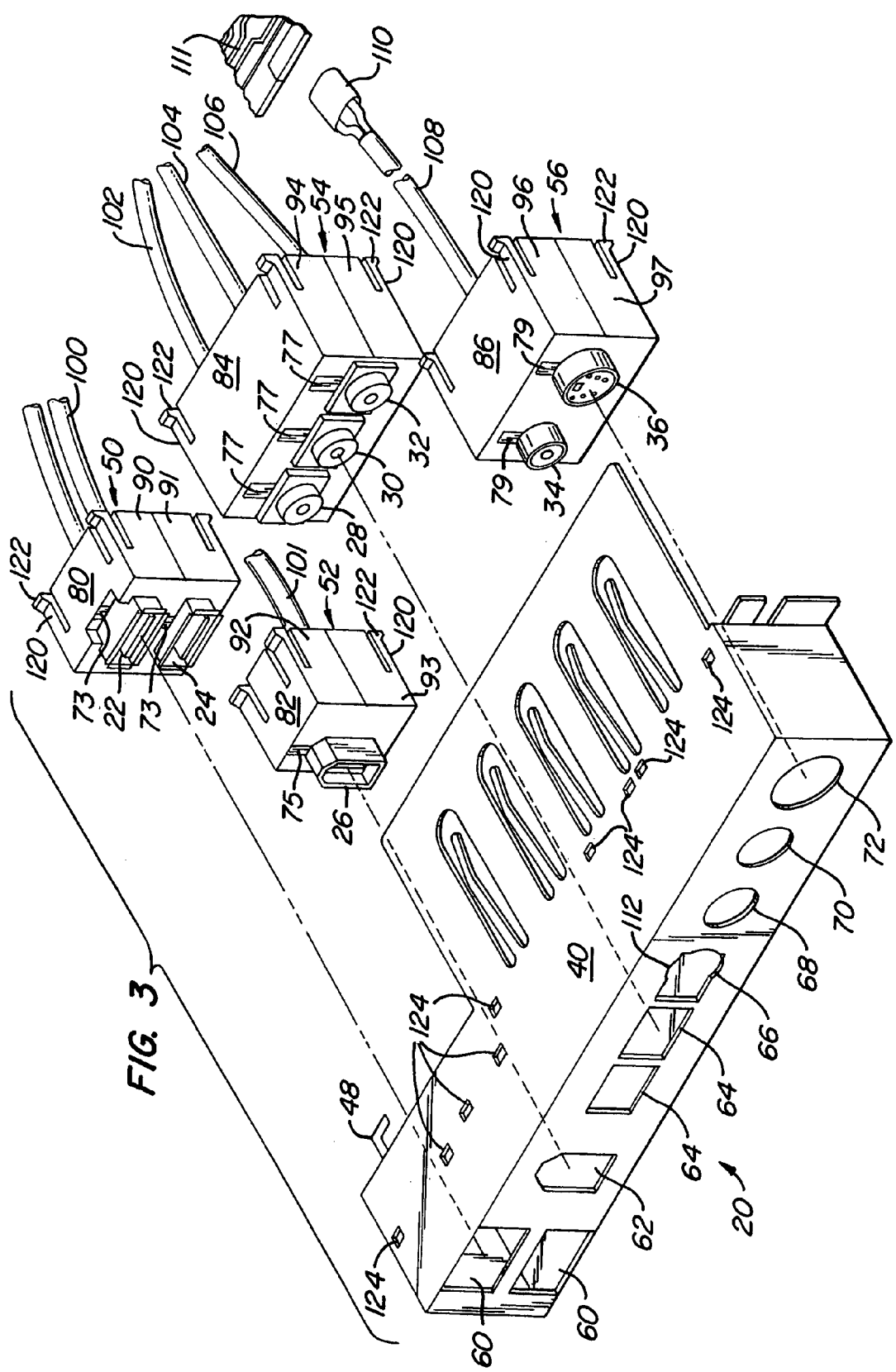
FIG. 3 shows an exploded view of the bracket and connector port holders of FIG. 2 before they are attached together.

Turning now to FIG. 3, an exploded view of the input/output connector assembly 20 is shown before the connector port holders 80, 82, 84, 86 of connector modules 50, 52, 54, 56 have been inserted into the bracket 40. As can be seen, port holes 60, 62, 64, 66, 68, 70, 72 are formed into the front of the bracket 40 to receive the various connector ports 22, 24, 26, 28, 30, 32, 34, 36. Each of the connector ports 22, 24, 26, 28, 30, 32, 34, 36 is, in turn, encapsulated in a connector port holder 80, 82, 84, 86 which can connect securely into the bracket 40. These connector port holders are preferably formed of a hard, heat resistant plastic. The inventors have found acrylonitrile-butadiene-styrene ("ABS") plastic to be a particularly suitable choice for these connector port holders 80, 82, 84, 86. Those of skill in the art will recognize, though, that other durable, heat resistant plastics could also be chosen for the connector port holders, such as poly vinyl chloride (PVC) plastic overmolded over a polyethylene core.

The connector port holders 80, 82, 84, 86 are preferably formed in two halves or clamshells 90, 91, 92, 93, 94, 95, 96, 97. Such clamshells can be formed, for example, through a plastic injection molding process. To assemble the connector modules 50, 52, 54, 56, a wire 100, 101, 102, 104, 106, 108 is attached to the appropriate connector port 22, 24, 26, 28, 30, 32, 34, 36 by, for example, soldering. The wire/connector port combination is placed between the appropriate mating clamshells and the clamshells are then sealed together. A preferred technique for sealing the clamshells together is ultrasonic welding, even though other techniques, such as snap fit and press-pin fit may also be used. At the other end of the wires 100, 101, 102, 104, 106, 108, a connection, such as with header 110, is made to the appropriate computer circuitboard 111.

In the preferred embodiment shown in FIG. 3, the connector ports 22, 24, 26, 28, 30, 32, 34, 36 of the present invention are held inside four connector port holders 80, 82, 84, 86. More specifically, the two USB connector ports 22, 24 are held in a first connector port holder 80, the IEEE 1394 high speed communications port is held in a second connection port holder 82, the three audio connector ports 28, 30, 32 are held in a third connection port holder 84 and the two video connector ports 34, 36 are held in a fourth connection port holder. The use of multiple connection port modules 50, 52, 54, 56 which are functionally grouped allows great flexibility in using a single input/output connector assembly 20 to construct a wide range of computers. For example, a low end computer might include the audio connector port module 54 and USB connector port module 50, but not the IEEE 1394 high speed communications port module 52 and video connector module 56. A higher end computer might include all four of the illustrated modules 50, 52, 54, 56. The top of the line computer might then have all four of the illustrated modules 50, 52, 54, 56, but with the audio module 84 enlarged to a right audio out connector port and a left audio out connector port. For this top of the line computer, the vacant port hole 68 shown in the FIG. 3 bracket 40 would then be put into use. To further accommodate this top of the line computer embodiment, the square edges of the audio port hole 66 are rounded off to accept the normally rounded left audio out connector port.

A second approach to achieving better grounding is also illustrated in FIG. 3. Adjacent to each of the connector ports 22, 24, 26, 28, 30, 32, 34, 36, a metal spring or tab 73, 75, 77, 79 is preferably constructed which is in electrical contact with the connector port. When the connector port holders 80, 82, 84, 86 are firmly placed into the bracket, the metal tabs 73, 75, 77, 79 also enter into electrical contact with the front of the bracket. To facilitate this electrical contact, the tabs 73, 75, 77, 79 are preferably formed of stainless steel and bent forward. By so doing, any electrical charges on the surface of the connector ports will be grounded to the bracket, and vice versa.

To firmly place the connector port holders. 80, 82, 84, 86 into the bracket 40, movable cantilever strips 120 with locking tabs 122 are preferably formed on the rear outside corners of each of the connector port holders 80, 82, 84, 86. The locking tabs 122 are designed to snap into locking tab receiving holes 124 which are formed on the upper and lower surfaces of the bracket 40. The interaction of the movable cantilever strips 120, locking tabs 122 and locking tabs receiving holes 124 is shown in greater detail in FIGS. 4A and 4B. More specifically, FIG. 4A shows a side view of a connector port holder 82 before it is inserted into the bracket 40. In order to successfully accomplish this insertion, the movable cantilever strips 120 are pressed downward. For ease of manufacture, the simple act of inserting the connector port holder 82 into the bracket 40 can effectuate this downward pressure as the rearward end 128 of the bracket 40 contacts the inclined leading edge 130 of the locking tabs 122. As the connector port holder is pushed fully forward into the bracket 40, the locking tabs 122 reach the locking tab receiving holes 124 in the bracket which causes the locking tabs 122 to snap into the holes 124. After the locking tabs 122 snap into the holes 124, the connector port holder 82 is securely connected to the bracket 40.

While this locking tab/bracket connection prevents the connector port holder 82 from falling away from the bracket due to vibration or normal pressure, the connector port holder 82 is nonetheless removable if desired. To effect this removal, one merely needs to simultaneously press down on the upper and lower locking tabs 122 until they clear the locking tab receiving holes 124. The connector port holder 82 can then be removed from the bracket 40 either by rearwardly pulling on the holder 82 itself or, less preferably, pulling on its wire 101.

In the foregoing specification, the invention has been described with reference to specific preferred embodiments and methods. It will, however, be evident to those of skill in the art that various modifications and changes may be made without departing from the broader spirit and scope of the invention as set forth in the appended claims. For example, while the computer input/output connector assembly of the present invention has been shown as being installed on the front of a personal computer tower in the preferred embodiment, it could just as easily be installed on the back of the tower or on a computer monitor. Similarly, the input/output connector assembly of the present invention could also be used on other types of electrical devices besides personal computers such as mainframe computers, routers, consumer electronic devices and appliances. For each different application, those of skill in the art will quickly recognize that the selection of connector ports and configuration of bracket holes could be varied to suit the particular application. Accordingly, the specification and drawings are to be regarded in an illustrative, rather than restrictive, sense; the invention being limited only by the appended claims.

What is claimed is:

1. A connector assembly incorporated into an electrical device comprising:
    a connector module having a connector port, a connector port holder and an electrical connection between said connector port and a circuit in said electrical device, wherein said connector port holder encloses through direct contact the region where said connector port is attached to said electrical connection and includes a locking tab;
    a bracket incorporated into said electrical device which receives said connector port holder, wherein said bracket has a port hole through which said connector port is inserted and a locking tab hole through which said locking tab is inserted.

2. The connector assembly of claim 1 wherein said electrical device is a computer, said electrical connection is a wire and said connector port is used for computer input or output.

3. The connector assembly of claim 2 further comprising of plurality of connector ports and locking tabs.

4. The connector assembly of claim 3 wherein said connector ports include a USB port, a high speed communications port, an audio port and a video port.

5. The connector assembly of claim 1 wherein said connector port holder is constructed of a hard, heat resistant plastic.

6. The connector assembly of claim 5 wherein said plastic is acrylonitrile-butadiene-styrene or poly vinyl chloride overmolded over polyethylene.

7. The connector assembly of claim 5 wherein said connector port holder is constructed of two halves.

8. The connector assembly of claim 7 wherein said connector port holder halves are joined together around said region where said connector port is attached to said electrical connection through ultrasonic welding.

9. The connector assembly of claim 1 wherein said locking tab is at the end of a movable cantilever strip and includes an inclined leading edge.

10. The connector assembly of claim 1 wherein said bracket is constructed of metal.

11. The connector assembly of claim 10 wherein said bracket includes a metal extension which electromagnetically contacts to an adjacent electrical component.

12. The connector assembly of claim 10 wherein said connector port holder includes a metal tab which electromagnetically contacts both said connector port and said metal bracket.

13. An input/output connector assembly incorporated into a computer comprising:
    a plurality of connector modules each having a connector port for the input or output of electrical signals, a connector port holder and an electrical connection between said connector port and a circuit in said computer, wherein each of said connector port holders encloses through direct contact the region where a connector port is attached to an electrical connection and includes a plurality of locking tabs;
    a metal bracket incorporated into said computer which firmly receives each said connector port holder, wherein said bracket has a plurality of port holes through which said connector ports are inserted and a plurality of locking tab holes through which said locking tabs are inserted.

14. The input/output connector assembly of claim 13 wherein said connector port holder is constructed in two halves from acrylonitrile-butadiene-styrene.

15. The input/output connector assembly of claim 13 wherein said plurality of connector ports includes two USB ports, an IEEE 1394 high speed communications port, an audio in port, an audio out port, a microphone port, an RCA video port and an S-video port.

16. The input/output connector assembly of claim 13 wherein said bracket includes a metal extension which electromagnetically connects to an adjacent electrical component and a metal tab on at least one of said connector port holders which electromagnetically contacts both said connector port and said metal bracket.

* * * * *